Patented Apr. 8, 1947

2,418,476

UNITED STATES PATENT OFFICE 2,418,476

PREPARATION OF ZINC DICYANIMIDE

Daniel E. Nagy and Bryan C. Redmon, Stamford, Conn., assignors to American Cyanamid Company, New York, N. Y., a corporation of Maine No Drawing. Application September 22, 1945, Serial No. 618,073

5 Claims. (Cl. 23—78)

The present invention relates to zinc dicyanimide and its preparation.

In particular, the present invention contemplates that zinc dicyanimide may be prepared by the reaction of a water soluble zinc salt with a water soluble metal dicyanimide salt. The zinc dicyanimide is substantially insoluble and may be recovered from the reaction mixture while the inorganic salts remain in solution. The general reaction is given in Equation 1.

(1) 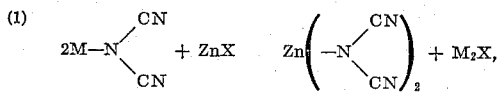

where M is a metal whose dicyanimide salt is soluble, and X is the anion portion of a soluble zinc salt.

Typical examples of the soluble zinc salts which may be used in the present invention are zinc acetate, zinc bromide, zince chloride, zinc iodide, zinc nitrate, and zinc sulfate. Typical soluble metal dicyanimide salts which may be used are calcium dicyanimide, barium dicyanimide, sodium dicyanimide, potassium dicyanimide, and lithium dicyanimide. The examples which follow serve to illustrate the present invention.

Example 1

Aqueous solutions containing substantially stoichiometric amounts of calcium dicyanimide and zinc chloride are carefully mixed. Colorless zinc dicyanimide precipitates from the thoroughly agitated reaction mixture, and after recovery and drying, a substantially quantitative yield of zinc dicyanimide is obtained. This colorless solid does not melt or decompose under substantially 315° C., nor is the material hygroscopic.

In order to characterize this solid, the optical and crystallographic properties are described. Zinc dicyanimide crystallizes in the orthorhombic system in a columnar habit, and it has a negative optic sign. The principal refractive indices as observed in white light are as follows:

$\alpha = 1.445 \pm 0.003$; $\beta = 1.698 \pm 0.003$;
and $\alpha = 1.702 \pm 0.003$ The apparent optic axial angle as observed in air is 24°, and the true optic axial angle computed therefrom is 14°. The crystals or oriented so that the principal vibration direction of $\alpha$ is parallel to "$c$", the elongated crystallographic axis.

Example 2

Again, as in Example 1, solutions containing stoichiometric amounts of sodium dicyanimide and zinc chloride are carefully mixed and thoroughly agitated. The substantially insoluble colorless zinc dicyanimide precipitates and after recovery, washing, and drying it is found to have the same physical properties as those recorded in Example 1.

The substitution of potassium dicyanimide for sodium dicyanimide in the above preparation of zinc dicyanimide also results in the formation of insoluble colorless zinc dicyanimide. The yields of zinc dicyanimide are substantially quantitative when prepared from either the sodium or potassium salts of dicyanimide.

The aforementioned preparations are typical of those contemplated in the present invention whereby soluble zinc salts react with soluble metal dicyanimide salts to yield substantially insoluble zinc dicyanimide.

Zinc dicyanimide is a valuable chemical intermediate and a source of dicyanimide useful in the preparation of pharmaceuticals, chemotherapeutic agents, insecticides, seed disinfectants, dyes, plastics, resins, and the like, and it may be used per se as an insecticide.

While the invention has been described with particular reference to specific embodiments, it is to be understood that it is not to be limited thereto but is to be construed broadly and restricted solely by the scope of the appended claims.

What is claimed:
1. Zinc dicyanimide.
2. A method of preparing zinc dicyanimide which includes the steps of reacting a soluble metal salt of dicyanimide with a soluble zinc salt in the presence of water to precipitate zinc dicyanimide.
3. A method of preparing zinc dicyanimide which includes the steps of reacting calcium dicyanimide with zinc chloride in the presence of water to precipitate zinc dicyanimide, and recovering zinc dicyanimide.
4. A method of preparing zinc dicyanimide which includes the steps of reacting sodium dicyanimide with zinc chloride in the presence of water to precipitate zinc dicyanimide, and recovering zinc dicyanimide.
5. A method of preparing zinc dicyanimide which includes the steps of reacting potassium dicyanimide with zinc chloride in the presence of water to precipitate zinc dicyanimide, and recovering zinc dicyanimide.

DANIEL E. NAGY.
BRYAN C. REDMON